(12) United States Patent
Marchese et al.

(10) Patent No.: US 10,040,981 B2
(45) Date of Patent: Aug. 7, 2018

(54) HOT MELT ADHESIVE CONTAINING A POLYAMIDE/ POLYOLEFIN HYBRID POLYMER

(71) Applicant: HENKEL AG & CO. KGAA, Duesseldorf (DE)

(72) Inventors: Luca Marchese, Arese (IT); Fabio Ticozzelli, Duesseldorf (DE); Ruediger Butterbach, Essen (DE); Judith Siepenkothen, Ratingen (DE); Juergen Foell, Duesseldorf (DE); Fabio Spada, Carate Brianza (IT)

(73) Assignee: HENKEL AG & CO. KGAA, Duesseldorf (DE)

( * ) Notice: Subject to any disclaimer, the term of this patent is extended or adjusted under 35 U.S.C. 154(b) by 265 days.

(21) Appl. No.: 14/814,939

(22) Filed: Jul. 31, 2015

(65) Prior Publication Data

US 2015/0337186 A1   Nov. 26, 2015

Related U.S. Application Data

(63) Continuation of application No. PCT/EP2014/052322, filed on Feb. 6, 2014.

(30) Foreign Application Priority Data

Feb. 6, 2013 (EP) .................................. 13154231

(51) Int. Cl.
| | | |
|---|---|---|
| C09J 153/00 | (2006.01) | |
| C08L 53/00 | (2006.01) | |
| C08K 5/00 | (2006.01) | |
| C08K 3/00 | (2018.01) | |
| C09J 177/06 | (2006.01) | |
| C08L 23/00 | (2006.01) | |
| C08L 77/00 | (2006.01) | |
| C08K 3/01 | (2018.01) | |

(52) U.S. Cl.
CPC ............. *C09J 177/06* (2013.01); *C08K 3/01* (2018.01); *C08K 5/0008* (2013.01); *C08L 23/00* (2013.01); *C08L 53/00* (2013.01); *C08L 77/00* (2013.01); *C09J 153/00* (2013.01)

(58) Field of Classification Search
CPC ....... C09J 153/00; C09J 177/06; C08L 53/00; C08L 23/00; C08L 77/00; C08K 5/0008; C08K 3/0008; C08K 3/01

USPC .......................................................... 524/505
See application file for complete search history.

(56) References Cited

U.S. PATENT DOCUMENTS

| | | | |
|---|---|---|---|
| 4,018,733 A | 4/1977 | Lopez et al. | |
| 4,791,164 A | 12/1988 | Wichelhaus et al. | |
| 4,914,162 A | 4/1990 | Leoni et al. | |
| 7,537,840 B2 * | 5/2009 | Miller ................... | C09J 177/00 428/458 |
| 2011/0091707 A1 | 4/2011 | Jousset et al. | |

FOREIGN PATENT DOCUMENTS

| | | | |
|---|---|---|---|
| CA | 2146905 A1 | 10/1995 | |
| DE | 3504804 A1 | 8/1986 | |
| EP | 0204315 A2 | 12/1986 | |
| EP | 0678543 A2 | 10/1995 | |
| EP | 0749463 B1 | 5/1998 | |
| GB | 1440810 A | 6/1976 | |
| GB | 2262939 A | 7/1993 | |
| JP | S49-096053 A | 9/1974 | |
| JP | S50-098937 A | 8/1975 | |
| JP | S60-184579 A | 9/1985 | |
| JP | S61-040356 A | 2/1986 | |
| JP | S62-086077 A | 4/1987 | |
| JP | H07-505422 A | 6/1995 | |
| JP | 2000-327789 A | 11/2000 | |
| JP | 2001-523294 A | 11/2001 | |
| JP | 2002-332355 A | 11/2002 | |
| JP | 2005-194507 A | 7/2005 | |
| WO | 9309175 A1 | 5/1993 | |
| WO | 2005056616 A | 6/2005 | |
| WO | 2006044522 A1 | 4/2006 | |
| WO | 2009138679 A1 | 11/2009 | |
| WO | WO-2012092233 A2 * | 7/2012 | ........ C09J 123/0853 |

* cited by examiner

*Primary Examiner* — Angela C Scott
(74) *Attorney, Agent, or Firm* — Sun Hee Lehmann

(57) ABSTRACT

The invention discloses a hot melt composition comprising a block copolymer consisting of at least two blocks as reaction product of a polyamide having a molecular weight of 5000 g/mol to 100000 g/mol and a modified olefin copolymer having a molecular weight of 3000 to 100000 g/mol and containing covalently bound organic acid anhydride groups to the polymer chain, wherein the polyamide has an amine number from 0.2 to 10 and the olefin copolymer has an acid number from 1 to 100.

19 Claims, No Drawings

HOT MELT ADHESIVE CONTAINING A POLYAMIDE/ POLYOLEFIN HYBRID POLYMER

FIELD OF THE INVENTION

The invention relates to a composition based on a reaction product of a polyamide having amino end groups and a polyolefin which has been modified to comprise cyclic acid anhydride reactive groups. The composition is meltable and can be used as hot melt adhesive.

BACKGROUND OF THE INVENTION

EP 1805238 discloses polypropylene copolymers which shall contain maleic acid anhydride groups. No reaction of this polymer with polyamides is disclosed.

DE 3504804 discloses hot melt compositions, which comprise blends of polyamides and ethylene/acrylate ester copolymers which comprise additionally anhydride groups. The disclosed ethylene/acrylate ester copolymers have a molecular weight of more than 80000.

EP 0678543 discloses a copolymer consisting of a styrene block copolymer for example SEBS, which contains maleic acid anhydride groups. On this styrene block copolymer polyamide blocks are grafted.

WO 93/09175 discloses a blend of a polyamide, an unmodified polyolefin copolymer and a carboxyl-grafted terpolymer of ethylene, propylene and diene. No reaction of the polyamide and the terpolymer is disclosed.

WO 2009/138679 discloses a grafted copolymer made of polyamide and polyolefins. The polyamides are disclosed as Nylon-type polyamide PA-6, PA-11, PA-12 or similar types with a low molecular weight, the polyolefins are specified in the examples as ethylene-acryl(meth)acrylate-copolymer. The viscosity of the end product is disclosed as more than 600 Pa*sec.

The prior art discloses that blends of polyamides and polyolefins are difficult to mix and to obtain a stable blend needs specific measures. One possibility to improve the compatibility of these polymer types is introducing carboxylic groups in the polyolefin. Another way to obtain these mixtures includes the reaction of a polyamide and specific modified polyolefins but as disclosed this reaction provide high viscosity products. So the different proposals to manufacture stable blends require the selection of specific polymers and phase separation can occur. Phase separation often leads to insufficient adhesive properties to different substrates.

The technical interest in these polymer blends is still given, as polyamides show good cohesion properties. But as such adhesive layer often does not have sufficient adhesion to polyolefin substrates such composition need further improvement.

SUMMARY THE INVENTION

It is the object of the present invention to provide a hot melt composition which can be applied at low temperatures and which shows an improved adhesion to polyolefin or other substrates such as steel or aluminum. It is a further object to provide a composition which has an improved compatibility of the components and where no phase separation occurs during the application process as melt and upon re-solidification of the composition.

The object is solved by a hot melt composition comprising a block copolymer consisting of at least two blocks as reaction product of a polyamide having a molecular weight of 5000 g/mol to 100000 g/mol and a modified olefin copolymer containing covalently bound acid anhydride groups, the modified olefin copolymer having a molecular weight of 3000 to 100000 g/mol, wherein the polyamide has an amine number from 0.2 to 10 and the olefin copolymer has an acid number from 1 to 100.

Another object of the invention is the process to manufacture such block copolymers by a reaction of a polyamide with a modified olefin copolymer. Another object is the process to manufacture such block copolymer in the presence of polypropylene copolymers.

DETAILED DESCRIPTION OF THE INVENTION

The composition comprises at least one block copolymer as reaction product of polyamides and modified olefin copolymers. Additionally it can include other additives, auxiliaries and/or polymers to modify the properties for application according to specific requirements. Such additives are generally known but they shall be selected so that the additives can be homogenously mixed to the composition and no phase separation shall occur. In a preferred embodiment the composition shall include at least non modified olefin copolymers, polyamides and/or modified olefin copolymers.

The composition according to the invention shall comprise at least one polyamide as block in the block copolymer. The polyamides can be prepared from different monomers provided however that the molecular weight is selected so that a polyamide is obtained which can be processed as melt at temperatures below 250° C. Dicarboxylic acids and diamines can be used as components of the polyamide which are generally known. Preferably linear polyamides are suitable.

Examples for suitable dicarboxylic acids include C4 to C60 dicarboxylic acids, especially adipic acid, azelaic acid, succinic acid, dodecanedioic acid, glutaric acid, suberic acid, maleic acid, pimelic acid, sebacic acid, undecanedioic acid or their mixtures. Another suitable polyamide includes dimerized fatty acids which are obtained by coupling unsaturated long chain monobasic fatty acids, e.g. linolenic acid or oleic acid. The dicarboxylic acids are well known and commercially available. As minor parts also monocarboxylic acids or tricarboxylic acids can be used, but cross-linked polyamides shall be avoided.

The diamine components are selected from one or more aliphatic diamines, preferably with an even number of carbon atoms, wherein the amine groups are at the ends of the carbon chains. Aliphatic diamines can comprise 2 to 20 carbon atoms, wherein the aliphatic chain can be linear or slightly branched. Specific examples are ethylenediamine, diethylenetriamine, dipropylenetriamine, 1,4-diaminobutane, 1,3-pentanediannine, methylpentanediamine, hexamethylenediamine, trimethylhexamethylenediamine, 2-(2-aminomethoxy)ethanol, 2-methylpentamethylenediamine, C11-neopentanediamine, diaminodipropyfmethylamine, 1,12-diaminododecane. The particularly preferred aliphatic diamines are C4-C12 diamines with an even number of carbon atoms. Another group of diamines is derived from dimer fatty acids which comprise primary amine groups instead of the carboxyl groups.

The amino components can also comprise cyclic diamines or heterocyclic diamines such as for example 1,4-cyclohexanediamine, 4,4'-diamino-dicyclohexylmethane, piperazine, cyclohexane-bis-(methylamine), isophoronediamine, dimethylpiperazine, dipiperidylpropane, norbornanediamine or m-xylylenediamine. The molecular weight of such cyclic diamines is between 80 g/mol to about 300 g/mol. In addition the amino component may contain polyoxyalkylene diamines, such as polyoxyethylene diamine, polyoxypropylene diamine or bis-(diaminopropyl)-polytetrahydrofuran, may also be used. The polyoxyalkylene diamines also known as "Jeffamines" (tradename of the Huntsman Co.) are particularly preferred. The polyoxyalkylene diamines are particularly preferred as amine component. Their molecular weight is between 200 and 4 000 g/mol, preferably between 400 and 2000 g/mol. The amount of such polyoxyalkylene diamine is between 0 to 15 mol %, preferably 0.5 to 15 mol %.

The polyamide may contain additionally aminocarboxylic acids or the cyclic derivatives thereof with C5 to C18 backbone in an amount up to 10 mol %. Examples of such components include 6-aminohexanoic acid, 11-aminoundecanoic acid, laurolactam and ε-caprolactam.

When choosing the monofunctional, difunctional or trifunctional raw materials as monomers, the amount shall be selected so that meltable, for example uncrosslinked polyamides shall be obtained. For example, if crosslinking/gelling occurs, then lowering the fraction of trifunctional components and/or increasing the content of monofunctional amines or fatty acids can result in polymers that do not tend to gel.

Examples of suitable polyamides based on dicarboxylic acids and polyether diamines are described in EP 749463. Another type of polyamides based on dimer fatty acids and polyamines is disclosed in EP 204 315.

For example useful polyamides are based on dimer fatty acid-free polyamides containing polyether diamines. They can be manufactured from 40 to 50 mol %, preferably 50 mol %, of one or more C4-C18 dicarboxylic acid(s), 5 to 45 mol %, preferably 15 to 40 mol % of at least one aliphatic diamine, 5 to 40 mol %, preferably 20 to 30 mol %, of one or more cycloaliphatic diamines, 0 to 40 mol %, preferably 5 to 25 mol % of polyether diamines, wherein the sum of the added diamines and the carboxylic acids each is 50 mol %, such that dicarboxylic acid components and diamine components are present in approximately equivalent molar fractions.

Another preferred example of useful polyamides is based on dimerized fatty acid as essential component. Such polyamides are, for example, comprising of 35 to 49.5 mol % dimerized fatty acid, 0.5 to 15 mol % monomeric fatty acid containing 12 to 22 carbon atoms, 2 to 35 mol % polyoxyalkylenediamines and 48 to 15 mol % aliphatic diamines containing 2 to 40 carbon atoms, wherein up to 65% of the dimerized fatty acids can be replaced by aliphatic dicarboxylic acids containing 4 to 12 carbon atoms.

In each case the sum of all carboxylic acid and of all amine shall add to 50 mol %.

In general, the quantities of the amine and the carboxylic acids are selected so that the polyamides contain a small excess of amino groups. According to the invention the amine number of a suitable polyamide is between 0.2 to 10 mg KOH/g solid, preferably 1 to 5. The molecular weight is about 5000 to 100000 g/mol, preferably 10000 to 50000 g/mol. The viscosity of such polyamides is between 1000 and 20000 mPas (measured at 200° C., Brookfield Thermosel RVT, EN ISO 2555), preferably between 5000 to 15000 mPas. The softening point is about 90 to 180° C., preferably less than 150° C.

The second polymer block contained in the block copolymer of the invention is selected from modified olefin copolymers. The term polymer includes homopolymers and copolymers including terpolymers, etc. The term modified olefin copolymers in this invention shall include propylene copolymers and ethylene copolymers comprising chemically bound cyclic acid anhydrides on the chain. Such modified propylene copolymers can be based on C3-monomers, including copolymers with C2 or other C4 to C10 olefins. Such modified ethylene copolymers can also be based on C2-monomers, including copolymers with C4 to C10 olefins. Such modified olefin copolymer shall contain covalently bound cyclic acid anhydride units, either contained in the polymer chain or grafted to the polymer chain. Especially preferred are maleic acid anhydride (MAH) grafted polypropylene copolymers. A preferred embodiment comprises modified olefin copolymers which do not contain monomers selected from acrylic esters. Another preferred embodiment selects modified propylene copolymers as suitable block.

One group of suitable modified olefin copolymers are propylene homopolymers having a molecular weight from 3000 to 50000 g/mol which contain one or two cyclic anhydride groups bond to the chain. They are commercially available.

Another group of suitable modified olefin copolymers are C3/C2-copolymers containing about 5 to 35% ethylene in the chain. Such polymers can be grafted by known methods with unsaturated acid anhydrides, e.g. maleic acid anhydride. Such copolymers shall have a molecular weight from 3000 to 75000 g/mol.

Another group of modified olefin copolymers are C3/C2 copolymers manufactured by metallocene catalysis. They have a relative short molecular weight of less than 15000 g/mol, and they are functionalized with acid anhydride groups. Commonly these polymers are declared as wax, having a low viscosity. These polymers are also commercially available.

Another embodiment of the invention manufactures the suitable modified propylene copolymers by thermal degradation. It can be manufactured from long chain polypropylene (co)polymers as starting polymer. To be suitable as modified propylene copolymer it is required, that the starting polymer is degraded in its molecular weight by a thermo mechanical process. In this process also the grafting with cyclic acid anhydrides can be performed. As starting polymers commercially available polypropylene (co)polymers based on C2/C3 are suitable, which may additionally comprise other comonomers, as $C_4$ to $C_{20}$ α-olefins. The ratio of the monomers can be varied in a broad range, but preferably less than 40% of ethylene is contained. The amount of propylene in the polypropylene (co)polymers is about 60 to 98 wt-% calculated of the total polymer weight. The amount of comonomers is about 2 to 40 wt %. Also mixtures and blends of different polypropylene (co)polymers can be used. Such starting polymers have a high molecular weight, a very high viscosity, which is expressed as low melt flow index (MFI), and are difficult to apply. Such polypropylene (co) polymers have a high melting more than 130° C. or higher, and as extruded material do not show adhesion properties. So they are not suitable for use in adhesive applications.

By the process to reduce the melt viscosity of the polypropylene (co)polymer degraded polymers with different properties can be obtained. Due to the controlled scission of the polymer chain, which occurs during the degradation process, the starting polymer is modified. This controlled scission, in effect, reduces the molecular weight of the polymer chains. As the average molecular weight is reduced, the melt viscosity is lowered and the molecular weight distribution is narrowed. In addition to the degradation process it is also possible to add unsaturated substances and graft them to the chain. In this case a suitable modified propylene copolymer is obtained which has a reduced molecular weight and contains covalently bound groups. A specific preferred unsaturated substance is maleic anhydride as cyclic, acidic or semi-ester form.

Preferably the melt viscosity, determined at 200° C. (Brookfield), of the polypropylene (co)polymer is reduced with at least one radical donor under shear and thermal stress to less than 50% of the original melt viscosity of the starting material.

In one embodiment the starting material has an original melt viscosity of at least 400,000 mPas at 200° C. (Brookfield). Typically the viscosity is so high, that a Brookfield viscosity cannot be determined accurately, so the melt flow index is determined. The MFI of the starting polymer is less than 20 g/min at 230° C. The modified propylene copolymer has a melt viscosity at 200° C. from 3,000 to 40,000 mPas preferably from 4,000 to 20,000 mPas.

Another group of suitable modified olefin copolymers are modified ethylene copolymers manufactured for example by metallocene catalysis. They have a molecular weight of less than 100000 g/mol. Such copolymers can be based on C2-monomers, including copolymers with C4 to C10 olefins. The copolymer can be obtained as randomly or as block copolymers, but they shall comprise bound acid anhydride groups on its chain. These polymers are also commercially available.

The modified olefin copolymer suitable for the present invention shall have a molecular weight (Mw) from 3000 to 100000 g/mol, preferably up to 75000 g/mol. Additionally the copolymer shall contain cyclic acid anhydride groups, preferably maleinic acid anhydride groups or succinic acid anhydride, the acid number in an amount of 1 to 100 mg KOH/g solid, preferably up to 70 mg KOH/g, most preferred up to 20 mg KOH/g.

The polyamide and the modified olefin copolymer react to form a block copolymer. This can be performed by blending the components in molten form and further reaction of the functional groups. The reaction takes place under heating of the mixture. It is possible to reduce the water content during the reaction, it is also possible to add a catalyst or to apply vacuum to support the reaction.

According to the amount of functional groups in the polymer chains at least one polyamide block and one modified olefin block react together. But it is also possible to obtain two or more polyamide blocks bond to one modified polyolefin blocks or to obtain two or more modified polyolefin blocks to one polyamide block. Preferably linear multiblock polymers are obtained. Also mixtures of different block copolymers can be obtained. The ratio of the amine number (polyamide) to the acid number (modified polyolefin) is selected that no gelled product is obtained. In a specific embodiment the amine number is less than 5 mg KOH/g. In another embodiment the ratio acid number/molecular weight of the modified olefin copolymer is between 1/30 and 1/1000.

The block copolymer according to the invention shall have a molecular weight (Mw) from 5000 to 150000 g/mol, the viscosity of the block copolymer is about 1000 mPas to 100000 mPas, preferably up to 60000 mPas. According to the used amounts of carboxylic groups and amino groups the block copolymer may still contain reactive groups. The softening point is about 80 to 215° C., preferably 90 to 200° C., depending on composition and polyamide structure.

The composition according to the invention shall comprise at least one block copolymer containing polyamide block(s) and polyolefin block(s). The composition can further include additionally non reacted polymers, e.g. polyamides identical or of different composition, polyolefin copolymers, identical or different from the modified olefin copolymers, or mixtures of both. It is also possible to incorporate olefin copolymers without any functional group in the composition. Specifically useful are polypropylene copolymers being non-modified but degraded starting polymers. Another group of suitable additional polymers include non modified polyethylene copolymers, preferably polyethylene block copolymers based on C2 to C8 without any functional groups.

In another embodiment the composition of the present invention comprises additionally additives known in the art such as plasticizers, oils, resins, stabilizers, antioxidants, pigments or fillers, fibers, dyestuffs, polymeric additives, adhesion promotors, or rheology modifiers. Additives can be selected to improve specific properties of the composition. They shall form homogenous compositions.

The purpose of the stabilizers is to protect the composition. In particular antioxidants or light-protection agents are used. They are added to the composition usually in quantities of up to 3 wt-%, by preference in quantities from approximately 0.1 to 1.0 wt-%. On the other hand also adhesion promotors can be used in the composition.

Also fillers can be employed. They comprise solid, inert substances, such as for example chalk, titanium dioxide, silicium dioxide or other pigments. The amount in the composition is less than 15 wt-%, particularly from 0 to 10 wt-%. Also gloss/matting agents can be used as additive. Also fibers can be incorporated, e.g. carbon, graphite, metal fibers or natural fibers, like cellulosic fibers.

The composition may comprise at least one tackifying resin as an additive. The resin may improve the adhesion. It is added in an amount of up to 30 wt-%, preferably 5 to 20 wt-%. Plasticizers are utilized by preference in order to adjust the viscosity or flexibility, and are contained in the composition generally in an amount from 0 to 10 wt-%, by preference in an amount from 0 up to 5 wt-%. It should be ensured that only additives are used which can be homogenously blended with the composition.

The composition according to the invention can be used on different application fields. It can be used as hot melt adhesive, so it will be applied in molten form to the substrates and on cooling and solidification the composition builds up the adhesive properties. It is also possible to use the composition as molding composition. In such case the solid product will provide parts which good adhesion to inserted parts. A further use is the manufacture of sealants.

The invention is also directed to a process to manufacture such block copolymers by thermo mechanical degradation of polypropylene (co)polymers. The process for reducing the melt viscosity of at least one polypropylene (co)polymer starting material to degraded propylene copolymers of lower molecular weight is generally known. It can be performed by reaction with at least one radical donor under shear stress at a temperature above the softening point of said polymer starting material. The process can be carried out in single screw extruders, twin screw extruders, Banbury mixers, kneaders and roll mills. Of these, it is particularly preferred to use single screw extruders, twin screw extruders, and kneaders. Such extruder include a feeding side and a product side, and additionally one or more sites to introduce other components. Additionally it is useful, to heat or to cool the mixture in the extruder. Also the application of a vacuum in the extruder is preferred, to get a product which is reduced or free in volatile products.

To manufacture the suitable modified propylene copolymers it is necessary to achieve a thermo mechanical degradation of the starting polymers. For example it is possible to degrade the polymers by shear stress in a first step. Additionally the polymer can be degraded by elevated temperature. To control and support the degradation it is preferred, that radical initiators are added to the reaction mixture. If the process is performed in the described form only non reactive degraded polypropylene polymers are obtained. If additionally unsaturated cyclic acid anhydrides are added to the reaction mixture then the modified propylene copolymers as used in the present invention are obtained.

The processes described above are usually performed at temperatures above the softening point of the at least one or a blend polypropylene(co)polymers as starting material, for example between 120° C. and 350° C. In certain embodiments the processes described above are performed under a nitrogen atmosphere. The level of shear applied to the reaction mixture is not critical but it is preferably equivalent to the shear stress generated within a twin-screw.

It will be apparent to those skilled in the art that the process for reducing the melt viscosity of at least one starting material with at least one radical donor under shear stress at a temperature above the softening point of said starting materials is not limited to a particular radical donor or class of radical donors. A number of radical donors, including azo compounds, diazo compounds and peroxides, such as organic peroxides, are useful with the present invention.

The radical donors of the present invention are generally added to the polymer blend starting materials a temperature less than 200° C. and are used in their function as radical donors at temperatures between 100° C. and 300° C. The amounts are added between 0.05 and 10% by weight, but preferably between 0.2 and 2% by weight, based on the total amount of the polymer blend starting materials used in the process.

By performing the reaction with the radical donors as described above the degradation can be performed at a temperature from 150 to 300° C., preferably from 180 to 280° C. If possible the process time shall be selected between 0.1 min to 5 min. After such time the concentration of the radical donor is low and stable polymers will be obtained. In the same process it is possible to perform the reaction in the presence of unsaturated cyclic acid anhydrides. Preferably maleic acid anhydride is used. So a grafted polypropylene copolymer can be obtained which include covalently bound acid anhydride groups. The amount of anhydride can be selected, so the all of the degraded polymer chains on a statistical basis shall contain cyclic anhydride groups. It is also possible to reduce the amount, so that only part of the degraded polymers will contain such acid anhydride groups. In such case a mixture of modified propylene copolymers and degraded polypropylene copolymers is obtained.

The process to manufacture the block copolymer from the polyamide and the modified olefin copolymer can be performed by blending the components and further reaction of the functional groups. One embodiment blends polyamide and modified olefin copolymers. The olefin copolymer shall be selected according to the different types as disclosed above and may be manufactured separately from the polyamide. The block copolymer according to the invention is obtained by the reaction of the components, which can be supported by heating and/or a catalyst. This reaction can be performed in any mixing device which can be heated to melt the polymers and to support the reaction.

The process can be performed as batch process or as continuous process. Preferred embodiments for manufacturing the composition start as first step with the manufacture of the polyamide. This can be done by known processes. The polyamide can be discharged, cooled, stored and remelted before prior use. It is also possible to use the melt directly for further processing.

The molten polyamide is mixed with the modified olefin copolymer. This can be done in a reaction vessel which can be stirred and heated. The mixture is heated and reacted. It is possible to blend in this mixture other additives as disclosed above. Additives which interfere with the reaction should be avoided prior to the reaction, but can be added after complete reaction.

Another embodiment of the invention includes a reaction in an extruder. According to this process the modified olefin copolymer is introduced in an extruder and processed, then the polyamide, optionally including additives, is added and mixed and reacted and build up the block copolymer according to the invention. It is also possible that additives or auxiliaries can be added to the mixture in later steps of extrusion process.

The amounts of the single components can be selected according to the need. If equimolar amounts of polyamide and modified olefin copolymer are selected the product will contain only the block copolymer. If the polyamide is added in an excess, then blend of block copolymer and polyamide is obtained. If the modified olefin copolymer is added in an excess, a blend of block copolymer and modified olefin copolymer is obtained. As already mentioned above in each of the cases additives and auxiliaries can be present additionally.

Even if the preferred process to degrade and react the polymers is performed in an extruder it is also possible to perform similar reaction steps in a heatable kneader.

According to another preferred embodiment the modified olefin copolymer is manufactured in-line and without separation step and directly reacted with the polyamide. A high molecular weight polypropylene (co)polymer as starting material is introduced in the extruder and together with radical starters and unsaturated cyclic acid anhydrides. During the shearing and heating process the modified propylene copolymer is manufactured. Thereafter to this mixture a polyamide is added and mixed. Alternatively it is also possible to conduct the degradation in the presence of the polyamide. The temperature is chosen in a way so that the components react to the block copolymer according to the invention. It is also possible during this process to add additives or auxiliaries either at the beginning or in later process steps. It is required that such additives shall not interfere with the degradation process or they shall be added after a suitable degradation has been reached. So at the end a ready made mixture of composition is obtained.

If during the degradation step only a small amount of cyclic unsaturated acid anhydride is used and also a suitable amount of polyamide, a three component composition is obtained including block copolymer, polyamide, and not reactive but degraded polypropylene copolymer.

The block copolymer according to the invention can optionally contain additives and shall form a composition. In another embodiment the block copolymer can be mixed with a polyamide either the same as incorporated in the reaction product or a different one. But it is particularly preferred that polyamides are selected among those containing fatty acids.

In another embodiment the composition comprises the block copolymer and additionally polypropylene copolymers. The copolymers can be selected as non-functionalized polypropylene copolymer and/or as modified propylene copolymer. Another embodiment includes a blend of block copolymer, polypropylene copolymer and polyamide. In another embodiment the composition shall comprise polyethylene copolymers instead of polypropylene copolymers.

The block copolymer can be used in the composition in a broad amount. It can be used as main component or as additive with other polymers. For example the amount is in the range from 5 to 99 wt-% of the composition, preferably 10 to 50 wt-% or 70 to 95 wt-%. The composition according to the invention can be used as hot melt adhesive. In such case the viscosity can range from 2000 to 200000 mPas, preferably up to 30000 mPas. The viscosity can be selected according to the application area. The selection of the composition of the block copolymer will influence the viscosity. Additionally it can be influenced also by the other ingredients, e.g. wax, plasticiser, tackifier or additional polymer, the man skilled may easily select useful components.

The block copolymer according to the invention can be used as single polymer or as part of a polymer blend. It shows excellent stability, so phase separation between other polyolefin components and polyamide components can be avoided. As stable to phase separation is understood, a molten sample of the composition will not separate in different phases for about one hour. Additionally a blend including such block copolymer shows good adhesion to different substrates. The water absorption of such composition is lower than in polyamide. The stability of the composition is improved, for example against fuel or alcohols, also against hydrolysis. The electrical insulation of such material is improved.

The hot melt compositions according to the present invention can be used on several areas. It can be used as polymer in a molding process. It can be used further as sealant. Preferably it can be used as hot melt adhesive for bonding of substrates of different types. A wide range of metal or plastics substrates are suitable as substrates, but especially it is useful for bonding polymeric surfaces. Examples of such materials are metals like steel, copper, brass, aluminium; polymers, like ABS, epoxy resins, polystyrene, polyamide, polymethyl methacrylate (PMMA), polyesters, polycarbonate, PVC, polyolefin especially polypropylene; paper, cardboard and coated paper substrates. The substrate may be rigid substrates or flexible sheets.

The manufacturing process provides a reduction of efforts and equipment and provides a process, which can be easily modified to incorporate other components or the different starting materials.

Methods Used in this Invention:
Amine number according to ASTM D 2074: mg KOH/g solid;
Acid number according to ASTM D 1980: mg KOH/g solid;
Viscosity according to EN ISO 2555, Brookfield;
MFI: ASTM D 1238;
Softening point: ISO 4625-1;
Molecular weight as measured by GPC: weight average molecular weight (Mw),
T-peel test according to DIN 53282 and DIN 53539;
Lap shear test according to ASTM D-1002.

Polyamide 1:
A polyamide was prepared by condensation reaction of 62.46 mol % dimer fatty acid, 37.54 mol % sebacinic acid, 48.98 mol % piperazine, 10.23 mol % Jeffamine D 2000 and 40.79 mol % ethylene diamine. Water was removed during the reaction.
Amine number: 6 mg KOH/g;
Melt viscosity: 4000 mPas (210° C.).

Polyamide 2:
A polyamide was produced in a manner known to a person skilled in the art from 100 mol % decanedioic acid, 50 mol % piperazine, 30 mol % Jeffamine D 400 and 20 mol % ethylene diamine by a condensation reaction with removal of the water of reaction.
This polyamide exhibited the following characteristic values:
MW: 13000 g/mol;
Melt viscosity: 9000 mPas (225° C.).

Polypropylene 3:
A commercially available modified polypropylene copolymer was used having a C2 content of about 17%.
Mw: 3000 g/mol;
Melt viscosity: 100 mPas (170° C.);
Acid number: 40 mg KOH/g.

Polypropylene 4:
A commercially available modified polypropylene copolymer was used.
Mw: 50000 g/mol;
Melt viscosity: 18000 mPas (170° C.);
Acid number: 15 mg KOH/g.

Polyethylene 5:
A commercially available modified polyethylene copolymer was used.
Mw: 5000 g/mol;
Melt viscosity: 400 mPas (170° C.);
Acid number: 6 mg KOH/g.

Polypropylene 6:
A commercial polypropylene (co)polymer (MFI 7 g/10 min, 230° C.), is used (having a C2 content of about 15%). The polymer is degraded in the presence of 0.8 mol % 3,6,9-triethyl-3,6,9-trimethyl-1,4,7-triperoxonane in the presence of 2,5-dioxofurane, at a temperature of about 200 to 300° C.
Mw: 10000 to 20000 g/mol;
Melt viscosity: 9000 mPas (200° C.);
Acid number: 5 mg KOH/g.

Adhesive 7:
The polyamide 1 was manufactured and mixed as molten product (90 wt %) with polypropylene 3 (10 wt %) as molten batch.
The mixture was reacted for about 30 min.
A clear and homogenous melt was obtained after cooling.
Mw: 13000 g/mol;
Melt viscosity: 9000 mPas (225° C.).

Adhesive 8:
The polyamide 1 was manufactured and mixed as molten product (89 wt-%) with polypropylene 4 (10 wt-%) as molten batch. Additionally 1 wt-% of a stabilizer was added and mixed.
The mixture was reacted for about 30 min.
A clear and homogenous melt was obtained after cooling.
Mw: 18000 g/mol;
Viscosity: 13000 mPas (225° C.).

Adhesive 9:
The polyamide 1 was manufactured and mixed as molten product (65 wt-%) with polypropylene 3 (5 wt-%). The temperature was kept at melt for about 120 minutes at 190° C. To this mixture 30 wt-% of a commercial non functionalised polypropylene copolymer was mixed. The final adhesive was allowed to cool.

A homogenous melt was obtained after cooling with the polyamide as continuous phase and the non functionalised polyolefin as dispersed phase.

Viscosity: 13825 mPas (200° C.);
Softening point: 163° C.;
Adhesion: T-peel PP/PP=35 N/cm;
Adhesion: T-peel steel=35 N/cm.

Adhesive 10:

The polyamide 1 was manufactured and mixed as molten product (65 wt-%) with polypropylene 4 (5 wt-%). The temperature was kept at melt for about 120 minutes at 190° C. To this mixture 30 wt-% of a non functionalised polypropylene copolymer was mixed. The final adhesive was allowed to cool.

A homogenous melt was obtained after cooling with the polyamide as continuous phase and the non functionalised polyolefin as dispersed phase.

Viscosity: 26500 mPa s (200° C.);
Softening point: 162° C.;
Adhesion: T-peel not treated PP/PP=34 N/cm;
Adhesion: T-peel steel=34 N/cm.

Adhesive 11:

The polyamide 1 was manufactured and mixed as molten product (65 wt-%) with polypropylene 4 (5 wt-%). The temperature was kept at melt for about 120 minutes at 190° C. To this mixture 30 wt-% of a commercially available non functionalised ethylene/octene copolymer was mixed. The final adhesive was allowed to cool.

A homogenous melt was obtained after cooling with the polyamide as continuous phase and the non functionalised polyolefin as dispersed phase.

Viscosity: 23500 mPa s (200° C.);
Softening point: 164° C.;
Adhesion: T-peel not treated PP/PP=36 N/cm;
Adhesion: T-peel steel=73 N/cm.

Adhesive 12:

The polyamide 1 was manufactured and mixed as molten product (65 wt-%) with polyethylene 5 (5 wt-%). The temperature was kept at melt for about 120 minutes at 190° C. To this mixture 30 wt-% of a non functionalised polypropylene copolymer was mixed. The final adhesive was allowed to cool.

A homogenous melt was obtained after cooling with the polyamide as continuous phase and the non functionalised polyolefin as dispersed phase.

Viscosity: 22400 mPa s (200° C.);
Softening point: 164° C.;
Adhesion to steel: 24 N/cm.

Adhesive 13:

The polyamide 1 was manufactured and mixed as molten product (65 wt-%) with polyethylene 5 (5 wt-%). The temperature was kept at melt for about 120 minutes at 190° C. To this mixture 30 wt-% of a non functionalised ethylene octene copolymer was mixed. The final adhesive was allowed to cool.

A homogenous melt was obtained after cooling with the polyamide as continuous phase and the non functionalised polyolefin as dispersed phase.

Viscosity: 25500 mPa s (200° C.);
Softening point: 161° C.;
Adhesion: T-peel PE=21 N/cm;
Adhesion: T-peel steel=68 N/cm.

Adhesive 14:

Separately a polyamide 1 was prepared.

70 wt % of polyamide 1 and 30 wt % polypropylene(co)polymer were mixed in an extruder (double screw type) together with the initiator and MAH, under the condition that only 25% of the amount of MAH was used required for the reaction of all polypropylene. The process was made according to polypropylene 5. So only about 25% of the propylene copolymer was reacted with carboxylic acid anhydride groups.

Additionally 1 wt-% of a stabilizer was added and mixed.

The temperature was held in a range from 150 to 280° C., and was cooled at the end of the extrusion. After a residence time of about 2 minutes the product was extruded and discharged.

A clear and homogenous melt was obtained.

The resulting composition shows:
Softening point: 150° C.;
Viscosity: 5000 mPas (210° C.);
Tg: −55° C.;
Adhesion:
T-peel not treated PP/PP 35 N/cm;
T-peel treated PE/PE 50 N/cm;
Lap shear PP/PP 2.0 N/mm2.

Adhesive 15:

Separately a polyamide 1 was prepared.

100 wt % of polyamide 1 and 100 wt % polypropylene (co)polymers were fed into an extruder (double screw type) together with the initiator and MAH and the initiator each in about 5 wt-%. The process was made according to polypropylene 5. The temperature in the extruder was between 150 and 280° C., a vacuum was applied. At the end the temperature was reduced to about 200° C. and the product discharged. The extrusion time was about 2 min.

The resulting composition has the following parameters.
Softening point: 153° C.;
Viscosity: 14000 mPas (200° C.);
Water absorption (24 h-immersion-2 mm)=1.2%;
Adhesion: T-peel not treated PP/PP=55 N/cm.

The invention claimed is:

1. A hot melt composition comprising:
a block copolymer consisting of at least two blocks as reaction product of (a) a polyamide having a molecular weight of 5,000 g/mol to 100,000 g/mol, and (b) a modified olefin copolymer having a molecular weight of 3,000 to 100,000 g/mol, and containing a plurality of covalently bound organic acid anhydride groups to the olefin copolymer chain,
wherein the polyamide has an amine number from 0.2 to 10 and the olefin copolymer has an acid number from 1 to 100.

2. The hot melt composition according to claim 1, characterized in that the polyamide comprises at least 35 mol-% of dimer fatty acid.

3. The hot melt composition according to claim 1, characterized in that the modified olefin copolymer is selected from a modified propylene copolymer and/or a modified ethylene copolymer containing cyclic acid anhydride groups.

4. The hot melt composition according to claim 3, characterized in that the modified polypropylene copolymer is obtained by thermal degradation of a high molecular weight polypropylene in the presence of a radical starter.

5. The hot melt composition according to claim 4, characterized in that the modified polypropylene copolymer is manufactured in the presence of a-cyclic acid anhydride.

6. The hot melt composition according to claim 1, characterized in that the composition further comprises an unreacted polyamide, a polypropylene and/or a polyethylene copolymer.

7. The hot melt composition according to claim 6, characterized in that the unreacted polypropylene copolymer is selected from a degraded polypropylene (co)polymer and/or a modified propylene copolymer.

8. The hot melt composition according to claim 6, characterized in that the unreacted polyethylene copolymer is selected from a polyethylene copolymer and/or a modified ethylene copolymer.

9. The hot melt composition according to claim 1, characterized in that the amine number of the polyamide is less than 5 and the ratio acid number/molecular weight of the modified olefin is between 1/30 to 1/1000.

10. The hot melt composition according to claim 1, characterized in that the composition further comprises additives selected from pigments, fibers, stabilizer, tackifier, plasticizer and/or other polymers.

11. The hot melt composition according to claim 1, characterized in that the composition comprises 5 to 99 wt-% of the block copolymer, based on the total composition.

12. A hot melt adhesive comprising the composition of claim 1, characterized in that the adhesive has a viscosity from 2,000 to 200,000 mPas at 200° C.

13. A process to manufacture a hot melt composition according to claim 1, characterized in that the block copolymer is prepared by (1) blending the polyamide and the modified olefin copolymer, and (2) heating the blend to a temperature so that at least part of the functional groups of the polyamide and the modified olefin copolymer react together.

14. The process to manufacture a hot melt composition according to claim 13, characterized in that the polyolefin/polyamide reaction product is prepared during the blending process in an extruder.

15. The process according to claim 13, characterized in that the modified olefin copolymer is manufactured by thermoreactive degradation of high molecular weight polypropylene (co)polymers in the presence of a radical starter and a cyclic unsaturated acid anhydride in an extrusion process.

16. The process according to claim 13, characterized in that the hot melt composition further comprises a non reacted polyamide and/or a non reacted polyolefin copolymer.

17. The process according to claim 16, characterized in that the non reacted polyolefin copolymer is selected from a modified polypropylene copolymer, a not modified degraded polypropylene copolymer and/or a polyethylene copolymer.

18. An article comprising a hot melt adhesive comprising the composition of claim 1.

19. The article of claim 18, which is a molding compound, an adhesive coating or a sealant.

* * * * *